United States Patent
Choi et al.

(10) Patent No.: US 9,078,188 B2
(45) Date of Patent: Jul. 7, 2015

(54) METHOD AND SYSTEM FOR PROCESSING HANDOVER IN HETEROGENEOUS MOBILITY PROTOCOL MIXED NETWORKS AND MIP CLIENT DEVICE

(75) Inventors: Woo-Jin Choi, Seoul (KR); Jung-Joon Kim, Gyeonggi-do (KR); Heung-Ryeol You, Gyeonggi-do (KR)

(73) Assignee: KT CORPORATION, Kyeonggi-do (KR)

( * ) Notice: Subject to any disclaimer, the term of this patent is extended or adjusted under 35 U.S.C. 154(b) by 335 days.

(21) Appl. No.: 13/309,098

(22) Filed: Dec. 1, 2011

(65) Prior Publication Data

US 2012/0076111 A1  Mar. 29, 2012

Related U.S. Application Data

(62) Division of application No. 13/001,613, filed as application No. PCT/KR2009/003502 on Jun. 29, 2009.

(30) Foreign Application Priority Data

Jun. 27, 2008 (KR) .................. 10-2008-0061507
Apr. 30, 2009 (KR) .................. 10-2009-0038424
Jun. 26, 2009 (KR) .................. 10-2009-0057792

(51) Int. Cl.
| | | |
|---|---|---|
| *H04W 4/00* | (2009.01) | |
| *H04W 36/14* | (2009.01) | |
| *H04W 36/00* | (2009.01) | |
| *H04W 36/18* | (2009.01) | |
| *H04W 76/02* | (2009.01) | |
| *H04W 76/06* | (2009.01) | |
| *H04W 80/04* | (2009.01) | |
| *H04W 88/16* | (2009.01) | |

(52) U.S. Cl.
CPC .......... *H04W 36/14* (2013.01); *H04W 36/0011* (2013.01); *H04W 36/18* (2013.01); *H04W 36/005* (2013.01); *H04W 76/022* (2013.01); *H04W 76/062* (2013.01); *H04W 80/045* (2013.01); *H04W 88/16* (2013.01)

(58) Field of Classification Search
CPC ... H04W 4/00; H04W 80/04; H04W 36/0011; H04W 36/08; H04W 36/14; H04W 36/18
USPC ........................................ 370/331
See application file for complete search history.

(56) References Cited

U.S. PATENT DOCUMENTS

| | | | |
|---|---|---|---|
| 2002/0085518 A1* | 7/2002 | Lim ............................ | 370/331 |
| 2008/0043674 A1* | 2/2008 | Suh et al. .................... | 370/331 |
| 2008/0095118 A1* | 4/2008 | Cakulev et al. ............. | 370/331 |
| 2008/0126555 A1* | 5/2008 | Rao ............................ | 709/230 |
| 2008/0254768 A1* | 10/2008 | Faccin ....................... | 455/411 |
| 2008/0320149 A1* | 12/2008 | Faccin ....................... | 709/228 |
| 2009/0022124 A1* | 1/2009 | Faccin ....................... | 370/338 |

* cited by examiner

*Primary Examiner* — Ayaz Sheikh
*Assistant Examiner* — Hai-Chang Hsiung
(74) *Attorney, Agent, or Firm* — IP & T Group LLP

(57) ABSTRACT

A method for processing handover to provide IP mobility for mobile user equipment, a system thereof, and a Mobile IP (MIP) client device using the same method. The method processing handover at a home agent in a heterogeneous protocol mixed network includes: at a home agent, creating a Proxy Mobile IP (PMIP) tunnel when user equipment accesses a PMIP network; at the home agent, creating a Client Mobile IP (CMIP) tunnel when a CMIP network is accessed due to handover of the user equipment; and at the home agent, severing the PMIP tunnel when the user equipment completes performing handover.

16 Claims, 10 Drawing Sheets

FIG. 1

| SDO | Scope | Acces Technologies | Standards |
|---|---|---|---|
| 3GPP | IWK among 3GPP accesses | LTE ↔ HSPA/WCDMA/GSM | TS 36.331, TS 23.401 |
| | | HSPA/WCDMA ↔ GSM | TS 25.331, TS 23.060 |
| | IWK between legacy 3GPP and Wi-Fi | HSPA/WCDMA/GSM ↔ Wi-Fi | TS 23.234 |
| | IWK between 3GPP and Non-3GPP access | LTE ↔ non-3GPP (ex., WiMACX, 3GPP2) | TS 23.402 |
| WiMAX Forum | ASN anchored handover, CSN anchored handover | WiMAX Intra-system Handover | WiMAC Network Architecture |
| | IWK between WiMAX and 3GPP LTE | WiMAX ↔ LTE | Baseline draft |
| | IWK between WiMAX and Legacy 3GPP access | WiMAX ↔ Legacy 3GPP access | Baseline draft |
| IETF | IP Mobility (CMIPv4) | IP Mobility Protocol (Host-based) | RFC 3344 |
| | IP Mobility (CMIPv6) | IP Mobility Protocol (Network-based) | RFC 5213 |
| | IP Mobility (MOBIKE) | IP Mobility Support + VPN | RFC 4555 |
| IEEE | Inter-system Handover Support (MIH) | Between IEEE accesses; Between IEEE access and non-IEEE access (i.e., 3GPP, 3GPP2) | IEEE 802.21 std. |

METHOD AND SYSTEM FOR PROCESSING HANDOVER IN HETEROGENEOUS MOBILITY PROTOCOL MIXED NETWORKS AND MIP CLIENT DEVICE

CROSS-REFERENCE TO RELATED APPLICATIONS

This application is a division of U.S. patent application Ser. No. 13/001,613 filed on Dec. 27, 2010, which is a national stage application of PCT/KR2009/003502 filed on Jun. 29, 2009, which claims priority of Korean patent application number 10-2008-0061507 filed on Jun. 27, 2008, 10-2009-0038424 filed on Apr. 30, 2009, and 10-2009-0057792 filed on Jun. 26, 2009. The disclosure of each of the foregoing applications is incorporated herein by reference in its entirety.

FIELD OF THE INVENTION

Exemplary embodiments of the present invention relate to a method for processing handover to provide IP mobility for mobile user equipment, a system thereof, and a Mobile IP (MIP) client device; and, more particularly, to a method for processing handover in a heterogeneous mobility protocol mixed networkS, a system thereof, and a MIP client device, which are for providing mobility of mobile user equipment in a heterogeneous mobility protocol mixed networkS where a method for providing mobility for mobile user equipment is changed to a Client Mobile IP (CMIP) scheme or a Proxy Mobile IP (PMIP) scheme according to the network to be accessed.

In an embodiment of the present invention, a client mobile Internet protocol (CMIP) and a proxy mobile Internet protocol (PMIP) will be described as an example of a heterogeneous mobility protocol. However, the present invention is not limited thereto. A method for processing handover between two different mobility protocols such as CLIP and PMIP is referred as a hybrid mobile Internet protocol (IP).

In an embodiment of the present invention, a CMIP IP version 4 or a PMIP IP version 4 is described. However, the present invention is not limited thereto. The present invention may be applied to an IP version 6 of CMIP and PMIP.

In case of CMIP, mobile user equipment and a home agent (HA) operate in a Collocated Care-of-Address (CCoA) mode where client-server based IP mobility is provided by allocating a CCoA to mobile user equipment without including an additional function for providing IP mobility at an access router. Alternately, mobile user equipment and a home agent (HA) may operate in a Foreign Agent Care-of-Address (FA CoA) mode by loading IP mobility at an existing access router. Accordingly, an embodiment of the present invention is described based on CMIP that operates in a CCoA mode without loading IP mobility at an access router. However, the present invention may be applied to CMIP that operates in a FA CoA mode.

An application scope of the present invention is not limited to a specific wireless access network. The present invention may be applied to at least two wireless access networks. Therefore, heterogeneous wireless access networks are described as a Worldwide Interoperability for Microwave Access (WiMAX) network and a Universal Mobile Telecommunications System (UMTS) network in an embodiment of the present invention. However, the present invention is not limited thereto. That is, throughout the specification, an embodiment of the present invention is described based on a WiMAX network applied with CMIPv4 operating in a CCoA mode and a UMTS network applied with PMIPv4. However, the present invention is not limited thereto. Hereinafter, an access network with CMIP applied to is referred as a CMIP network, and an access network with PMIP applied to is referred as a PMIP network.

A simultaneous binding mode is applied in an embodiment of the present invention. In the simultaneous binding mode, a home agent maintains a CMIP tunnel created with mobile user equipment through a CMIP network and a PMIP tunnel created with an access gateway of a PMIP network when mobile user equipment moves between a CMIP network and a PMIP network. However, the present invention is not limited thereto. The present invention may be applicable without the simultaneous binding mode. That is, the present invention may be applicable when a new PMIP tunnel (or a new CMIP tunnel) is created after canceling an existing CMIP tunnel (or an existing PMIP tunnel) during handover.

In an embodiment of the present invention, a handover process is performed based on handover policy and network configuration information downloaded from a Media Independent Information server (MIIS) when mobile user equipment moves between a WiMAX network and a UMTS network. The MIIS is defined in IEEE 802.21 access network Media Independent Handover (MIH). For this, it is assumed that an access gateway of a UMTS network includes a MIH function. However, the present invention is not limited to IEEE 802.21 access network MIH.

In an embodiment of the present invention, a handover process is performed between networks each supporting a different mobility protocol. For example, a handover process is performed for moving from a PMIP network (UMTS network) to a CMIP network (WiMAX network) or for moving from a CMIP network (WiMAX network) to a PMIP network (UMTS network). Meanwhile, a horizontal handover process or a vertical handover process is performed between networks supporting the same protocol according to a typical method. Accordingly, the detailed descriptions thereof are omitted because it is not necessary to describe the present invention.

DESCRIPTION OF RELATED ARTS

Lately, various types of portable communication devices such as a notebook computer supporting wireless network, a personal digital assistant (PDA), and a portable telephone having a data transmission function have been popular. Hereinafter, such a portable communication device is referred as user equipment (UE) through the specification. Further, the necessity of IP mobility of user equipment have been increased as wireless Internet services have been activated based on different types of technologies such as a wireless local area network (WLAN), a 3G cellular system, and IEEE 802.16. The providing IP mobility of user equipment means that a seamless service is guaranteed when an IP address is changed because user equipment changes a subnet.

Due to the necessity of IP mobility, various methods have been introduced to provide IP mobility to mobile user equipment. As one of representative technologies for providing IP mobility, Internet Engineering Task Force (IETF) has introduced a Client Mobile Internet Protocol (CMIP) and a Proxy Mobile IP (PMIP). Here, the PMIP has been in progress for standardization. Particularly, an IP version 6 of PMIP has been completely standardized, and an IP version 4 of PMIP has been in progress for standardization.

In the CMIP, mobile user equipment informs a home agent of a current location (IP mobility). For this, the CMIP requires mobile user equipment to have a MIP client function. The mobile user equipment registers at the home agent using a MIP signaling message when the mobile equipment moves to other access point.

One of advantages of the CHIP is to provide client-server based IP mobility between mobile user equipment and a home agent by allocating a Collocated Care-of-Address (CCoA) to mobile user equipment without an additional function loaded at an existing access router for providing IP mobility.

However, the CMIP is ineffective in view of utilization of wireless resources and power consumption of user equipment because a location registration signal must be transmitted and received through a wireless period. Further, it is required to allocate a new IP address whenever user equipment changes a subnet. Accordingly, handover is disadvantageously delayed due to the allocation of new IP address. Moreover, user equipment must have a MIP function for the CHIP.

In order to compensate such disadvantages of CMIP, the IETF has been standardizing a PMIP. The PMIP is a protocol providing network based IP mobility. The PMIP provides IP mobility even to mobile user equipment not having a MIP function.

In the PMIP, an IP mobility providing function of an access router performs a location registration procedure instead of mobile equipment. Accordingly, the PMIP is effective in view of wireless resource utilization and power consumption because it is not required to transmit or to receive a location registration signal in a wireless section. Although the mobile user equipment changes a subnet, the mobile user equipment uses the same IP address. That is, it is not required to allocate a new IP address. Accordingly, handover delay may be reduced. Due to such advantages of the PMIP, the PMIP is included in a WiMAX Forum network Architecture Release Version 1.2.0.

However, the CMIP and the PMIP have been designed to operate independently to provide IP mobility to user equipment. Due to such a reason, it has been required to embody a mobility protocol of a heterogeneous network as only one of the CMIP and the PMIP to provide a seamless service while mobile user equipment performs a handover process.

For example, mobile user equipment can receive a seamless service within a network supporting a CMIP if mobility is provided based on a CMIP. Or, mobile user equipment can receive a seamless service within a network supporting a PMIP if mobility is provided based on a PMIP. However, the user equipment provided mobility based on a CMIP cannot have a seamless service if the user equipment enters to a network supporting a PMIP. Or, the user equipment provided mobility based on a PMIP cannot have a seamless service if the user equipment enters to a network supporting a CMIP.

Furthermore, the PMIP networks coexist with the CMIP networks because the PMIP and the CMIP were introduced at different times. Therefore, it has been required to develop a method for providing mobility of mobile user equipment to provide a seamless service although user equipment moves between the CMIP network and the PMIP network.

In order to realize all networks as a PMIP network, it is required to load an IP mobility providing function at an access router. Accordingly, an access router has to be replaced or modified in case of existing CMIP networks.

Accordingly, it is an object of the present invention to overcome the prior art problems.

SUMMARY OF THE INVENTION

An embodiment of the present invention is directed to a method for processing handover to provide mobility of user equipment in a heterogeneous mobility protocol mixed network, a system thereof, and a mobility Internet protocol (MIP) client device.

Another embodiment of the present invention is directed to a method for processing handover to provide IP mobility through handover between a CMIP network and a PMIP network, a system thereof, and a MIP client device.

Still another embodiment of the present invention is directed to a method for processing handover to provide mobility of mobile user equipment in a heterogeneous mobility protocol mixed network where a mobility providing scheme is changed to a CMIP or a PMIP according to an access network, a system thereof, and a MIP client device.

Yet another embodiment of the present invention is directed to a method for process handover to provide IP mobility to user equipment in a heterogeneous mobility protocol mixed network by applying a CMIP to a wireless access network having difficulty to modify an access router and by applying a PMIP to a wireless access network capable of modifying an access router, a system thereof, and a MIP client device.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for processing handover in a heterogeneous mobility protocol mixed network includes creating a Proxy Mobile IP (PMIP) tunnel at a home agent when user equipment accesses a PMIP network; creating a Client Mobile IP (CMIP) tunnel at the home agent when a CMIP network is accessed due to handover of the user equipment; and canceling the PMIP tunnel at the home agent when the user equipment completes performing handover.

In accordance with another embodiment of the present invention, a method for processing handover in a heterogeneous mobility protocol mixed network includes: creating a CMIP tunnel at a home agent when user equipment accesses a CMIP network; creating a PMIP tunnel at the home agent when the user equipment decides to perform handover; and canceling the CMIP tunnel at the home agent when the user equipment completes performing handover by accessing the PMIP network.

In accordance with still another embodiment of the present invention, a method for processing handover includes: being allocated with a home IP address to form a PMIP tunnel by accessing a PMIP network at user equipment; accessing a CMIP network when the user equipment decide to perform handover; forming a CMIP tunnel to a home agent at the user equipment; and canceling the PMIP tunnel by caning the PMIP network when the user equipment completes performing handover.

In accordance with yet another embodiment of the present invention, a method for processing handover includes: forming a CMIP tunnel to a home agent by accessing a CMIP network at user equipment; forming a PMIP tunnel by informing beginning of handover according to a decision to perform handover at the user equipment; completing performing handover by accessing the PMIP network at the user equipment; and requesting the home agent to cancel the CMIP tunnel.

In accordance with yet another embodiment of the present invention, a heterogeneous mobility protocol mixed system includes an access gateway of a PMIP network configured to register an IP address of user equipment at a home agent by loading a Proxy Mobility Agent (PMA) when the user equipment accesses a PMIP network; and the home agent configured to register the IP address of the user equipment when the user equipment accesses the CMIP network, allocate a home IP address to the user equipment, create a CMIP tunnel to the user equipment, create a PMIP tunnel to an access gateway of the PMIP network according to the IP address registration of the user equipment through the access gateway of the PMIP network, allocate a home IP address to the user equipment, and cancel a MIP tunnel of a previous access network when the user equipment completes performing the handover.

In accordance with yet another embodiment of the present invention, a mobile IP client device includes a MIP sensor configured to sense whether a network to be accessed is a CMIP network or a PMIP network; a first MODEM configured to perform wireless access to a base station of the PMIP network; a second MODEM configured to perform wireless access to a base station of the CMIP network; a MIP driver configured to provide IP mobility of user equipment by performing a MIP client function; and an access controller configure to drive one of the first MODEM and the second MODEM according to the sensing result of the MIP sensor and control driving the MIP driver.

In accordance with yet another embodiment of the present invention, a method for processing handover in a heterogeneous mobility protocol mixed network includes: allocating a home IP address to user equipment when the user equipment accesses a PMIP network, performing a binding process for the user equipment and transmitting and receiving data by generating a PMIP tunnel; starting handover to a CMIP network according to a decision to perform handover to the CMIP network; canceling the handover to the CMIP network when a handover process is decided to perform to the PMIP network before completing performing the handover to the CMIP network; and transmitting and receiving data through the CMIP network.

In accordance with yet another embodiment of the present invention, a method for processing handover in a heterogeneous mobility protocol mixed network includes: allocating a home IP address at user equipment when the user equipment accesses a CMIP network, performing a binding update process for the user equipment, and transmitting and receiving data by generating a CMIP tunnel; starting performing a handover process to a PMIP network according to a decision to perform handover to the PMIP network; canceling the handover to the PMIP network according to a re-decision to perform handover to the CMIP network before completing the handover to the PMIP network; and transmitting and receiving data through the CMIP network.

In accordance with yet another embodiment of the present invention, a method for processing handover in a heterogeneous mobility protocol mixed network includes: transmitting and receiving data by performing a CMIP registration procedure when user equipment accesses a CMIP network; maintaining a corresponding PMIP resource in an idle station by performing a PMIP network accessing process and a PMIP registration process during transmitting and receiving data; and performing a handover process by activating the PMIP resource in the idle state according to a decision to perform handover from a CMIP network to a PMIP network.

In accordance with yet another embodiment of the present invention, a method for processing handover in a heterogeneous mobility protocol mixed network includes:

transmitting and receiving data by performing a PMIP registration procedure when user equipment accesses a PMIP network; maintaining a corresponding CMIP resource in an idle state by performing a CMIP access process and a CMIP registration process while transmitting and receiving data; and performing handover by activating the CMP resource in the idle state according to a decision to perform handover from a PMIP network to a CMIP network.

As described above, the present invention relates to a hybrid mobile IP mechanism for interworking a WiMAX network and a UMTS network. In a hybrid mobile IP system, IP mobility of mobile user equipment is provided by a CMIP while the mobile user equipment is accessing one access network. When the user equipment moves to the other access network, the IP mobility of the mobile user equipment is provided by a PMIP.

The hybrid mobile IP provides IP mobility handover between two access networks, one having a CMIP loaded and the other having a PMIP loaded.

As described above, the embodiments of the present invention provide mobility of mobile user equipment by performing handover in a heterogeneous mobility protocol mixed network.

That is, the embodiments of the present invention provide a seamless service to one mobile user equipment in a PMIP network and a CMIP network. In other words, the embodiments of the present invention provide IP mobility to mobile user equipment in a heterogeneous mobility protocol mixed network through interworking of a CMIP and a PMIP by applying a CMIP to a wireless access network having difficulty to modify an access router or by applying a PMIP to a wireless access network where an access router is easily modified.

Further, the embodiments of the present invention enable handover between two networks when IP mobility is applied between a CMIP applied WiMAX network and a PMIP applied UMTS network. Accordingly, handover between heterogeneous wireless networks can be performed without interruption of communication.

Moreover, the continuity of an application service can be provided by performing handover between heterogeneous networks without interrupting communication.

BRIEF DESCRIPTION OF THE DRAWINGS

FIG. 1 is a table illustrating standardization activities for interworking of different wireless access networks.

DETAILED DESCRIPTION OF THE INVENTION

Figure 2:
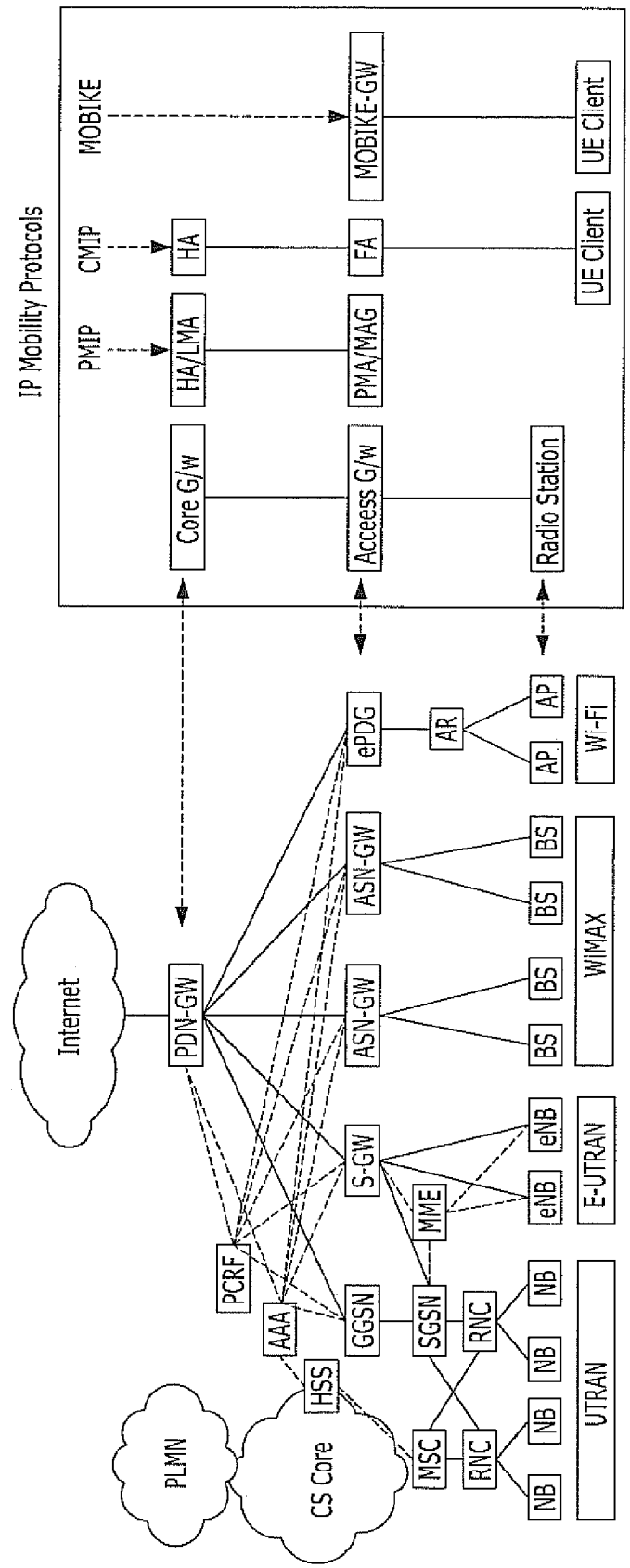
FIG. 2 is a diagram illustrating an interworking network architecture introduced in 3GPP and WiMAX forum.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is a table illustrating standardization activities for interworking of wireless access networks.

Lately, various types of wireless access networks have been embodied all over the world. Accordingly, many researches and studies have been made for interworking of Global Systems for Mobile communication (GSM), Wideband Code Division Multiple Access (WCDMA), Code Division Multiple Access (CDMA), Worldwide Interoperability for Microwave Access (WiMAX), Wi-Fi, and 3rd Generation Partnership Project Long Term Evolution (3GPP LTE). Function architecture has been standardized to provide interworking between such access networks.

The table of FIG. 1 shows standardization activities of 3GPP, WiMAX Forum, Internet Engineering Task Force (IETF), and Institute of Electrical and Electronics Engineers (IEEE). Like LTE, HSPA/WCDMA, and GSM, 3GPP has been standardizing network architecture for interworking between 3GPP access networks. The network architecture supports interworking between a 3GPP based access network and non-3GPP access networks such as WiMAX, Wi-Fi, and CDMA.

A Client Mobile IP (CMIP) and a Proxy Mobile IP (PMIP) have been considered as a candidate for a mobility protocol for a 3GPP structure for interworking with other access network. In the WiMAX Forum, a 3GPP interaction structure has been modified as a baseline framework for interaction.

FIG. 2 is a diagram illustrating an interworking network introduced in 3GPP and WiMAX Forum. That is, FIG. 2 illustrates an interworking structure for interaction between WiMAX and 3GPP LTE defined in 3GPP TS 23.402 and a WiMAX Forum baseline draft.

In such a structure, WiMAX access is considered as a non-3GPP network having reliability, and an ASN_GW, an access gateway of WiMAX is directly connected at 3GPP PDN-GW. Further, an ASN-GW is directly connected to other network constituent element of PCRF, AAA (Authentication, Authorization, Accounting), 3GPP PS core network.

Meanwhile, a non-3GPP network such as a Wireless local area network (WLAN) is connected to a PDN_GW through an ePDG. Here, the ePDG performs authentication, authorization, and accounting necessary for interworking with a network not having reliability instead of a 3GPP core network. In such a structure, the PDN-GW is an anchor point for interworking with other wireless access network.

When IP mobility function is configured for providing IP mobility, an optimal location for a home agent (HA) function is a PDN-GW. A foreign agent (FA) function may include a GGSN, a S-GW, an ASN-GW, and an ePDG.

3GPP TS 23.402 introduces three IP mobility protocols for interworking between 3GPP wireless access and non-3GPP wireless access. The three IP mobility protocols are as follows.

(1) CMIP version 4 operating in a FA CoA mode
(2) PMIP version 6
(3) MOBIKE (IKEv2 Mobility and Multihomming: RFC 4555) for mobility management in non-3GPP network having no reliability An IP mobility solution, not considered in a 3GPP and WiMAX Forum, is a CMIP that operates in a CCoA mode. In the CCoA mode, the CMIP does not require an access gateway such as a GGSN, a S-GW, an ASN-GW, and an ePDG to have a FA function. The CMIP also allows mobile user equipment to directly register with own IP address at a home agent without help of a FA.

An embodiment of the present invention relates to a hybrid mobile IP for interworking between heterogeneous wireless access networks. When mobile user equipment moves in a wireless network having an access gateway not having a FA function in case of a CMIP or not having a PMA/MAG function in case of a PMIP, IP mobility may be provided by a CMIP operating in a CCoA mode. When mobile user equipment moves to a wireless network having an access gateway having a FA function or a PMA/MAG function, the IP mobility of mobile user equipment may be provided by one of a CMIP and a PMIP in a FA CoA mode.

Figure 3:
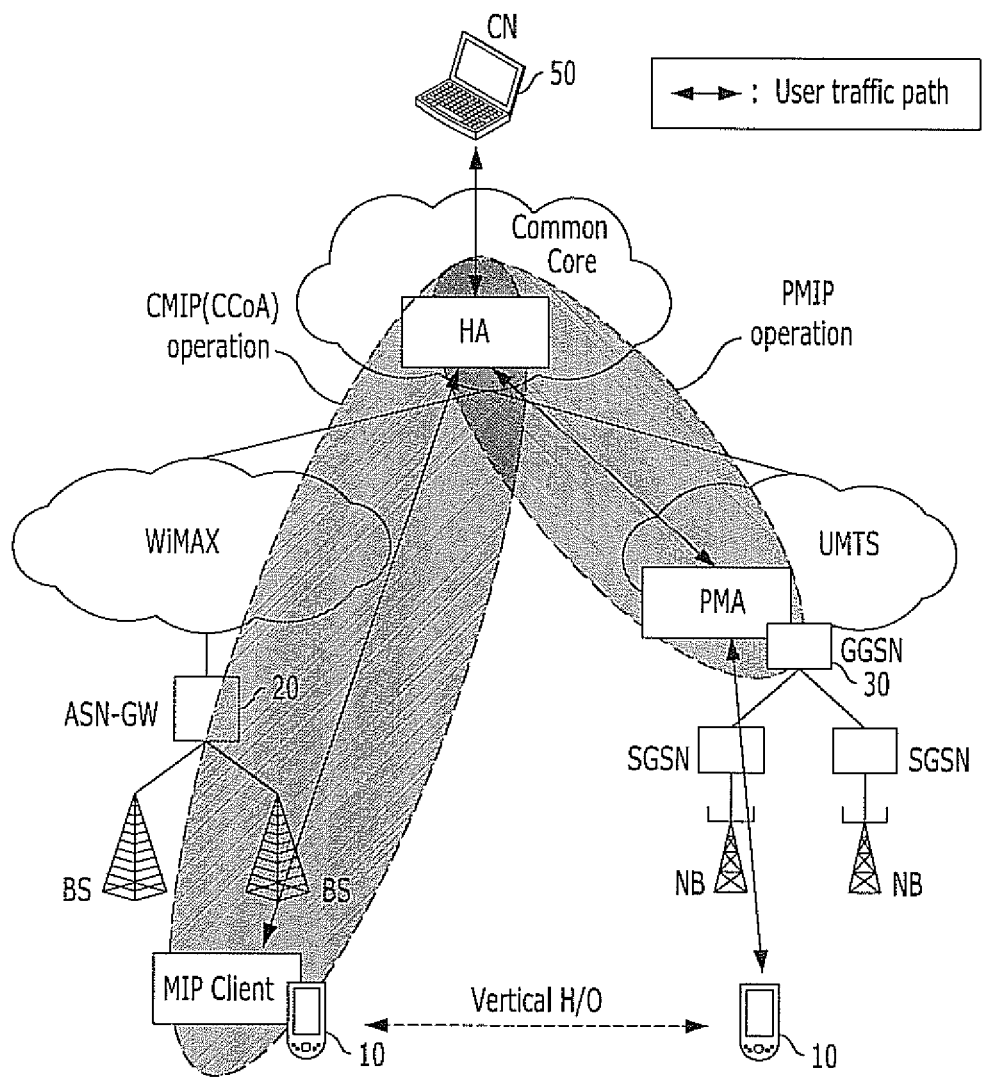
FIG. 3 is a diagram illustrating a heterogeneous mobility protocol mixed network in accordance with an embodiment of the present invention.

FIG. 3 is a diagram illustrating a heterogeneous mobility protocol mixed network in accordance with an embodiment of the present invention.

That is, FIG. 3 is a diagram for describing hybrid mobile IP operation. It illustrates hybrid mobile IP operation for handover between a WiMAX network and a UMTS network.

A Gateway GPRS Support Node 30 (GGSN), an access router of a UMTS network, includes a Proxy Mobile IPv4 (PMIP v4) Proxy Mobility Agent (PMA) function. An Access Service Network Gateway 20 (ASN-GW) of the WiMAX network does not include a Proxy Mobile IP (PMIP) function.

While user equipment 10 is accessing the WiMAX network, IP mobility is provided to the user equipment 10 by a CMIP operating in a CCoA mode. The user equipment 10 registers an own IP address at a home agent (HA) 40 using the CMIP protocol. A correspondent node (CN) 50 communicating with the user equipment 10 transmits and receives user traffic through the HA 40.

When the mobile user equipment 10 performs handover to the UMTS network, the GGSN 30 senses it and the PMA function of the GGSN 30 registers the IP address of the mobile user equipment 10 to the HA 40. While the mobile user equipment 10 is accessing the UMTS network, the CMIP function of the mobile user equipment 10 does not operate. The mobile user equipment 10 operates in simple IP mode.

When the mobile user equipment 10 performs handover from the UMT network to the WiMAX network, the CMIP function of the mobile user equipment 10 operates again. The user traffic is transmitted and received through a MIP tunnel between the mobile user equipment and the home agent (HA). Such hybrid mobile IP (IMP) operation will be described in detail hereinafter.

As shown in FIG. 3, a heterogeneous mobility protocol mixed network includes a WiMAX network with CMIP-CcoA mode applied and a UMTS network with PMIP applied. The WiMAX and the UMTS network may be overlapped to each other or independent from each other. Further, the WiMAX network and the UMTS network may be partially overlapped to each other.

The ASN-GW 20 of the WiMAX network may not have any function for providing IP mobility and may include a Foreign Agent (FA) function for allocation a CCoA to the mobile user equipment 10. Such an ASN-GW 20 of the WiMAX network has a function identical to that of an ASN-GW of a typical CMIP network.

The GGSN 30 of the UMTS network has a PMIP function. Such a GGSN 30 creates an IP tunnel with the HA 40 and performs a location registration of mobile user equipment 10 when handover is performed.

The HA 40 transfers data received from the mobile user equipment 10 to the correspondent node (CN) 50 through an IP tunnel or transfers data received from the CN 50 to the mobile user equipment 10 through the IP tunnel.

The HA 40 has an access network detection function and a dual IP tunnel creation function. That is, the access network detection function determines whether the mobile user equipment 10 accesses a CMIP network or a PMIP network in order to enable interworking between the CMIP network and the PMIP network. Further, the dual IP tunnel creation function creates an IP tunnel to the mobile user equipment 10 or to the GGSN 30.

The access network detection function detects an access network of the mobile user equipment 10 through a source address recorded in a header of a message received in location registration of the mobile user equipment 10, that is, when binding update is requested. The source address may be an address of the user mobile equipment when the mobile user equipment 10 accesses the CMIP network (i.e., WiMAX network in FIG. 3). Further, the source address may be an address of the GGSN 30 when the mobile equipment 10 accesses the PMIP network (i.e., WiMAX network in FIG. 3).

Further, the access network detection function uses a network identifier included in a MIP registration message received in location registration of the mobile user equipment 10 (when binding update is requested) to determine whether the mobile user equipment 10 access the CMIP network or the PMIP network. Here, the network identifier may be a mobility protocol identifier, and the network identifier may be included an option field of a MIP registration message. The network identifier may be one of a code informing that the mobile user equipment 10 accesses the CMIP network or a code informing that the mobile user equipment 10 accesses the PMIP network.

The dual IP tunnel creation function may create an IP tunnel differently according to a network that the mobile user equipment 10 accesses. That is, the HA 40 performs the dual IP tunnel creation function to create an IP tunnel to the mobile user equipment 10 when the mobile user equipment 10 accesses the CMIP network and to create an IP tunnel to the GGSN 30 when the mobile user equipment 10 accesses the PMIP network.

Hereinafter, the IP tunnel from the HA 40 to the mobile user equipment 10 is referred as a CMIP tunnel, and the IP tunnel from the HA 40 to the GGSN 30 is referred as a PMIP tunnel.

The mobile user equipment 10 in accordance with an embodiment of the present invention includes constituent elements to seamlessly access a PMIP network or a CHIP network and being provided with mobility according to CHIP or PMIP. Such a MIP client device of the mobile user equipment 10 is shown in FIG. 4.

Figure 4:
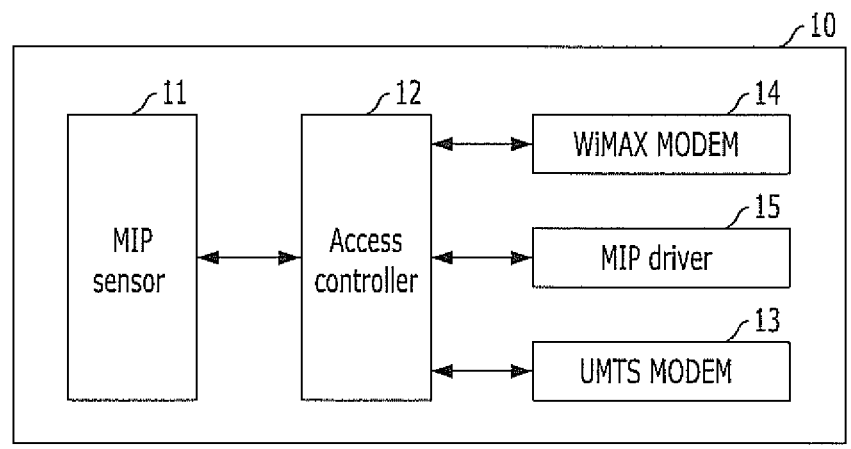
FIG. 4 is a diagram illustrating a MIP client device in accordance with an embodiment of the present invention.

FIG. 4 is a diagram illustrating a MIP client device in accordance with an embodiment of the present invention.

As shown in FIG. 4, the MIP client device in accordance with an embodiment of the present invention includes a MIP sensor 11, an access controller 12, a UMTS MODEM 13, a WiMAX MODEM 14, and a MIP operation unit 15.

The MIP sensor 11 senses a CMIP network or a PMIP network that the mobile user equipment 10 currently tries to access (initial access or handover access). The MIP sensor 11 receives a signal transmitted from a base station (or Node-B (NB)) of an access network through a corresponding MODEM and analyzes the received signal to determine one of the CMIP network and the PMIP network. Here, the signal may be an advertisement message or a pilot signal. Alternately, the MIP sensor 11 receives a network identifier transmitted from one of a CMIP network and a PMIP network through a corresponding MODEM and analyzes the received network identifier to sense one of the CMIP network and the PMIP network. Further, the MIP sensor 11 determines one of the CMIP network and the PMIP network according to a CMIP access instruction or a PMIP access instruction input from a user.

The access controller 12 controls at least one of the WiMAX MODEM 14 and the UMTS MODEM 13 according to the sensing result of the MIP sensor 11. Further, the access controller 12 controls the MIP operation unit 15. The access controller 12 controls the WiMAX MODEM 14 and the MIP operation unit 15 to interwork each other when the mobile user equipment 10 accesses the CMIP network. Hereinafter, such interworking the MIP operation unit 15 with the UMTS MODEM 13 or the WiMAX MODEM 14 is referred as activation.

Meanwhile, the access controller 12 may activate all of the UMTS MODEM 13, the WiMAX MODEM 14, and the MIP operation unit 15. In this case, the access controller 12 temporally activates one of the UMTS MODEM 13 and the WiMAX MODEM 14 and puts it into an idle mode.

The UMTS MODEM 13 is in charge of wireless accessing with a base station of a PMIP network, and the WiMAX MODEM 14 is in charge of wireless accessing with a base station of a CHIP network.

The MIP operation unit 15 performs a MIP client function to provide IP mobility of the mobile user equipment according to CMIP and is mounted at an IP spec of the mobile user equipment 10.

Figure 5:
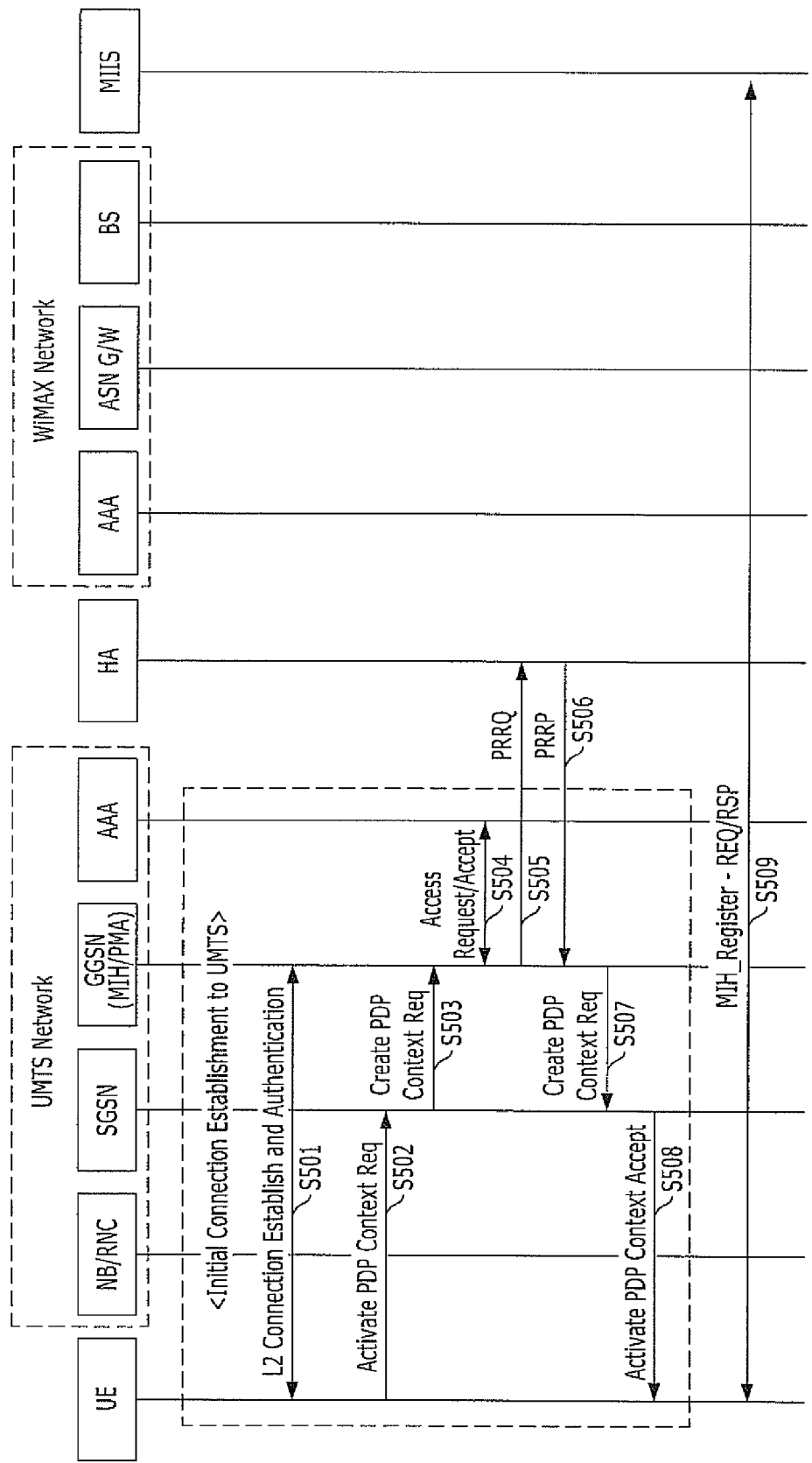
FIG. 5 is a diagram illustrating an initial access procedure for accessing a UMTS network.

FIG. 5 is a timing diagram illustrating an initial access procedure for accessing a UMTS network.

3GPP specification defines an initial access procedure for accessing a UMTS network at mobile user equipment. Additional signaling procedure for driving Proxy Mobile IP (PMIP) is a Proxy Registration ReQuest (PRRQ) message and a Proxy ReQuest (PRRP) message exchanged between the PMA function of GGSN and the HA.

When the HA receives a PRRQ message from the GGSN, the HA allocates a Home IP address (HoA) for mobile user equipment and transfers a PRRP message with a corresponding IP address to the GGSN. The GGSN notifies the allocated IP address to the mobile user equipment using a PDP context message.

After allocating the IP address to the mobile user equipment, the mobile user equipment performs registration at a MIH Information Server (MIIS) and downloads handover related policy and network configuration information from the MIIS.

Hereinafter, such an initial access procedure for accessing the UMTS network will be described in detail.

At step S501, the UMTS MODEM of the mobile user equipment performs a wireless access and authentication procedure for accessing the UMTS network. That is, the UMTS MODEM of the mobile user equipment performs the wireless access and authentication procedure with a GGSN using a L2 Connection Establish and Authentication message at step S501.

At steps S502 to S504, the UMTS MODEM of the mobile user equipment performs a path establishment request procedure for the data service of the UMTS network. That is, the UMTS MODEM of the mobile user equipment requests 'Packet Data Protocol Context' activation to a Serving GPRS Support Node (SGSN) using an 'Activate Packet Data Protocol (PDP) Context Request' message at step S502. At step S503, the SGSN requests the GGSN to create 'Packet Data Protocol Context' using a 'Create PDP Context Request' message. At step S504, the GGSN requests access permission to an AAA server and receives authentication from the AAA server.

At steps S505 and S506, the GGSN performs a PMIP registration procedure. That is, the GGSN requests registration to the Home Agent using a Proxy Registration ReQuest (PRRQ) message. At step S506, the Home Agent secures and allocates an home IP address for the mobile user equipment and transfers the corresponding IP address to the GGSN by loading the corresponding IP address in the Proxy Registration RePly (PRRP) message. Particularly, the PMIP client device mounted at the GGSN performs the PMIP registration procedure to the Home Agent.

At step S507, the GGSN transfers an IP address to be allocated to the mobile user equipment to the SGSN using a 'Create PDP Context Request' message. At step S508, the SGSN allocates the IP address to the mobile user equipment using an 'Activate PDP Context Accept' message.

After allocating the IP address to the mobile user equipment, the mobile user equipment transmits to a MIIS a MIH_Register-REQ message. Then, the MIIS performs a registration procedure for corresponding mobile user equipment and transmits a MIH_Register-RSP message to the mobile user equipment at step S509. The mobile user equipment downloads information about the policy of the heterogeneous protocol handover and network configuration, which are required to make decision for handover.

Figure 6:
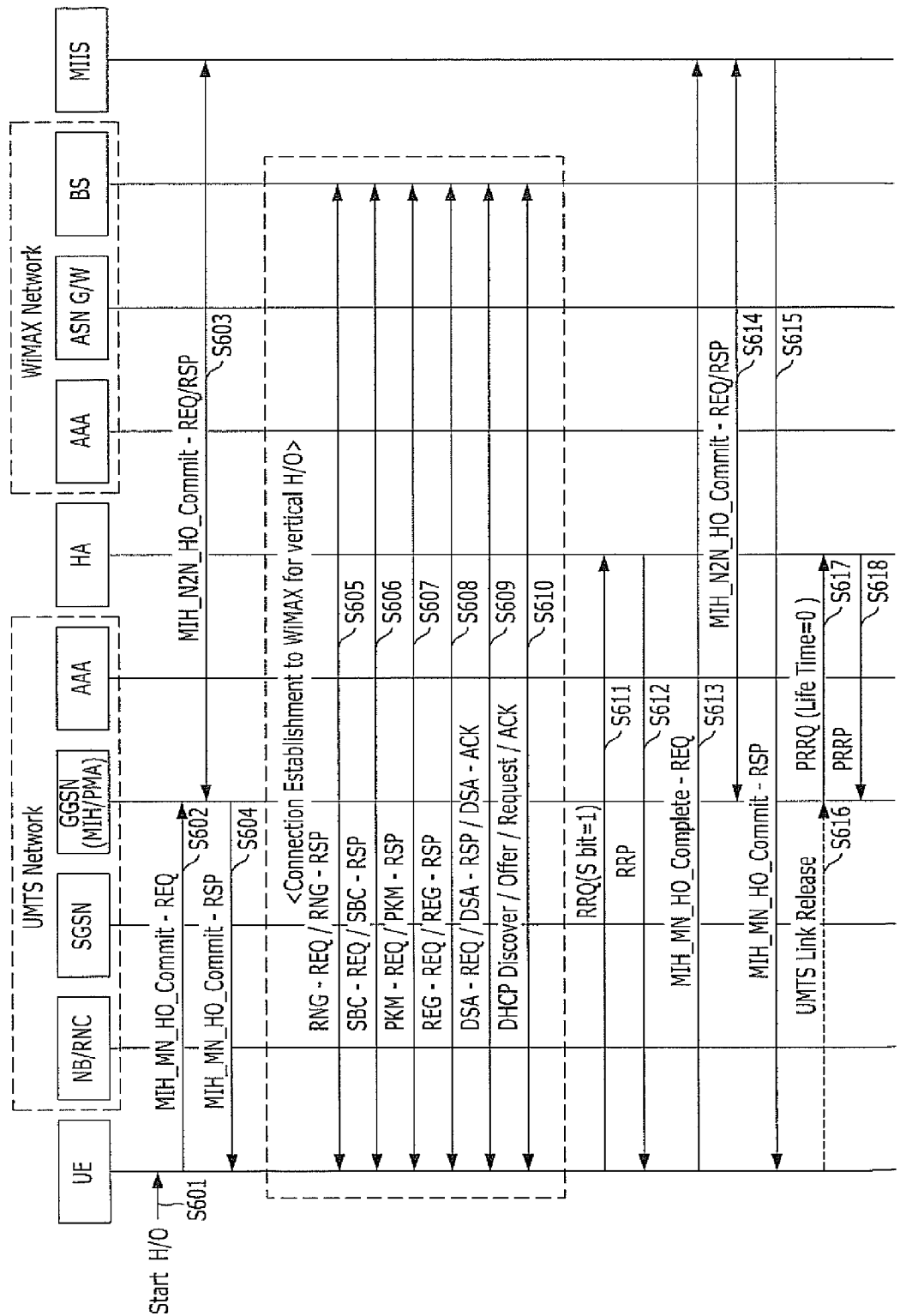
FIG. 6 is a flowchart illustrating a method for processing handover in a heterogeneous mobility protocol mixed networks in accordance with an embodiment of the present invention.

FIG. 6 is a flowchart illustrating a method for performing handover in a heterogeneous protocol mixed network in accordance with a first embodiment of the present invention. For example, the flowchart of FIG. 6 shows a handover signaling procedure from a UMTS network to a WiMAX network (a cancelation after connection scenario).

Mobile user equipment accesses a UMTS network and transmits and receives traffic through a GGSN.

If the mobile user equipment senses a WiMAX base station and if an intensity of a signal received from the WiMAX base station is sufficiently enough to provide a WiMAX service, a handover process may be performed from the UMTS network to a WiMAX network.

If it is decided to perform a handover process, the mobile user equipment transmits a Handover Commit message to the GGSN. When the mobile user equipment receives a Handover Commit response message from the GGSN, the mobile user equipment starts accessing the WiMAX network.

Until the mobile user equipment completely accesses the WiMAX network, the mobile user equipment transmits and receives user traffics through the UMT network. After the mobile user equipment completely accesses the WiMAX network, the mobile user equipment transmits a Registration ReQuest (RRQ) message to the home agent (HA). Here, if a S bit is setup at a RRQ message header, the HA allows both of the UMTS network and the WiMAX network simultaneous binding. After simultaneously binding the UMTS network and the WiMAX network, the HA may transmit user traffic through the UMTS network and the WiMAX network at the same time.

The mobile user equipment receives a Registration RePly (RRP) message, the mobile user equipment exchanges a Handover Complete message with the MIIS and severs the UMTS network access.

When the GGSN senses the access cancelation, the GGSN transmits to the HA a PRRQ message having lift time setup with 0. The HA receives the PRRQ message from the GGSN and severs a PMIP tunnel between the HA and the GGSN.

Hereinafter, a handover processing method in a heterogeneous protocol mixed network in accordance with an embodiment of the present invention will be described in more detail.

At steps S601 to S604, the mobile user equipment performs a procedure for informing the MIIS of handover. If the MIIS has a function detecting a state of a target network to handover, the MIIS may advice the mobile user equipment through a response message transmitted to the mobile user equipment. For example, the MIIS may determine whether the target network to handover has sufficient wireless resources or not and may advise the mobile user equipment whether it is proper to perform the handover process or not based on the determination result.

That is, when the handover from the UMTS network to the WiMAX network starts at the step S601, the mobile user equipment transmits a MIH_MN_HO_Commit-REQ message to the GGSN at step S602. At step S603, the GGSN transmits to the MIIS a MIH_N2N_HO_Commit-REQ message and receives a MIH_N2N_HO_Commit-RSP message as a response thereof at step S603. At step S604, the GGSN transmits the MIH_MN_HO_Commit-RSP message to the mobile user equipment. Then, the mobile user equipment performs a wireless access and authentication procedure for accessing the WiMAX network at steps S605 to S610.

At step S605, the mobile user equipment controls timing of a wireless signal according to a distance between a base station and a mobile user equipment and selects a frequency channel to be used using a procedure of transferring a RNG-REQ message to a base station of the WiMAX network and receiving a RNG-RSP message as a response thereof from the base station of the WiMAX network.

At step S606, the mobile user equipment negotiates a providing function with the base station using a procedure of transferring a SS Basic Capability request (SBC-REQ) message to the base station of WiMAX network and receiving a SBC response (SBC-RSP) message from the base station of WiMAX network as a response thereof.

At step S607, the mobile user equipment requests authentication using a Primary Key Management (PKM) request (PKM-REQ) message between the mobile user equipment and the base station of WiMAX network. Then, an authentication procedure is performed through an EPA request (EPA-REQ) message between the base station of WiMAX network and an ASN-GW of the WiMAX network and an Access Request/Accept message between the ASN-GW of the WiMAX network and the AAA server. Then, the authentication result is transferred through a PKM response (PKM-RSP) message between the mobile user equipment and the base station of the WiMAX network.

At step S608, negotiation with a network for Internet service is requested using a Registration Request (REG-REQ) message between the mobile user equipment and the base station of WiMAX network. The negotiation procedure is performed for the Internet service through a Registration Request (REG-REQ) message and a Registration Response (REG-RSP) message between the base station of WiMAX network and the ASN-GW of WiMAX network. The negotiation result is transferred using a REG response (REG-RSP) message between the mobile user equipment and the base station of WiMAX network.

The mobile user equipment performs a service flow generation procedure for Internet service using a Dynamic Service Addition REQuest (DSA-REQ) message, a DSA response (DSA-RSP) message, and a DSA acknowledgement (DSA-ASK) between the base station of WiMAX network and the mobile user equipment at step S609.

At step S610, the mobile user equipment performs a CCoA allocation procedure to allocate an IP address through a Dynamic Host Configuration Protocol (DHCP). That is, the mobile user equipment requests IP allocation by transferring a DHCP Discover message to an ASN-GW of WiMAX network through the base station of WiMAX network. The ASN-GW receives the DHCP Discover message and receives an IP address to be allocated to the mobile user equipment from the home agent. Then, the ASN-GW of WiMAX network informs that the corresponding IP address is available by transferring the IP address transferred from the home agent to the mobile user equipment through a DHCP Offer message. The mobile user equipment informs an intention of using the IP address by transferring a DHCP Request message to the ASN-GW of WIMAX network. Then, the ASN-GW of WIMAX network finally allows the mobile user equipment to use the corresponding IP address by transferring a DHCP ACK message to the mobile user equipment.

After finishing the WiMAX network access procedure, the mobile user equipment performing CMIP registration to the HA by transferring a Registration ReQuest (RRQ) message to the HA at step S611. The HA allows simultaneous binding to both of the UMTS network and the WiMAX network if a S bit of the RRQ message header is setup as 1. After establishing the simultaneous binding, the HA can transmit user traffic to both of the UMTS network and the WiMAX network at the same time. That is, a CMIP tunnel is established to the mobile user equipment while maintaining an existing PMIP tunnel according to the simultaneous binding. Accordingly, user traffic can be transmitted to the UMTS network and the WiMAX network at the same time. Here, the CHIP client included in the mobile user equipment substantially performs a CMIP registration procedure with the Home Agent.

After the mobile user equipment receives the RRP message from the HA at step S612, the mobile user equipment performs a procedure of informing the MIIS of handover completion at steps S613 to S615. The MIIS notices the handover completion to the GGSN of the UMTS network which is a previous access network.

When the mobile user equipment transmits a MIH_MN_HO complete request (MIH_MN_HO_Complete-REQ) message to the MIIS at step S613, the MIIS transmits the MIH_N2N_HO_Complete-REQ message and receives a MIH_N2N_HO complete response (MIH_N2N_HO_Complete-RSP) message as a response thereof at step S614. Then, a MIH_MN_HO_Complete-RSP message is transmitted to the mobile user equipment at step S615.

When the mobile user equipment requests canceling a UMTS link to the GGSN at step S616, the GGSN performs a PMIP registration canceling procedure at steps S617 and S618. That is, the GGSN requests cancelling registration by setting up a life time of a Proxy Registration ReQuest (PRRQ) message to '0' at step S617. At step S618, the home agent transmits a Proxy Registration RePly (PRRP) message to the GGSN to sever a PMIP tunnel between the Home Agent and the GGSN. Particularly, a PMIP client included in the GGSN performs the PMIP registration cancelation procedure with the home agent.

When the PMIP tunnel between the home agent and the GGSN is canceled as described above, only the CMIP tunnel between the Home Agent and the mobile user equipment is maintained. Accordingly, user traffic is continuously transmitted or received through the corresponding CMIP tunnel.

Hereinafter, a handover procedure in a heterogeneous protocol mixed network after the initial access procedure for accessing the UMTS network will be described.

The MIP sensor 11 of the mobile user equipment 10 monitors a network to access when power is turned on, when a user request Internet service, or when a user gives instruction of accessing a predetermined network. In the network monitoring procedure, it is assumed that the IMP sensor 11 senses accessing the PMIP network.

The access controller 12 activates the UMTS MODEM 13. Accordingly, the UMTS MODEM 13 performs an accessing try procedure for resource negotiation between a base station and a GGSN 30 for accessing the UMTS network and for exchanging information between the mobile user equipment 10 and a base station.

Then, the GGSN 30 performs authentication of the mobile user equipment 10 through an AAA server located at the UMTS network. The AAA server of the PMIP network shares authentication of the mobile user equipment 10 with an AAA server of the CMIP network for interworking with the CHIP network.

Then, the mobile user equipment accesses the GGSN 30 by the UMTS MODEM 13, and the GGSN 30 receives a HoA from the HA 40. The GGSN 30 provides the received HoA to the mobile user equipment 10 and requests binding update (location registration) of the mobile user equipment 10 to the HA 40 using own address as a CCoA address. When requesting the binding update, a network identifier is transmitted to inform accessing the PMIP network. The HA detects that an access network currently accessed by the mobile user equipment 10 is the PMIP network based on the network identifier.

The HA 40 performs binding update, transmits the binding update result to the GGSN 30, and generates a PMIP tunnel between the HA 40 and the GGSN 30.

The mobile user equipment 10 transmits and receives data to/from the correspondent node 50 through the PMIP tunnel.

When a user instructs accessing a CMIP network or when the mobile user equipment 10 enters the CMIP network from the PMIP network while the mobile user equipment 10 is transmitting and receiving data to/from the correspondent node 50, the MIP sensor 11 of the mobile user equipment 10 generates a handover event. Then, the access controller 12 interrupts the operation of the UMTS MODEM 13 and activates the WiMAX MODEM 14 to instruct accessing CHIP network.

The WiMAX MODEM 14 accesses the ASN-GS 20 through resource negotiation with a base station of the CMIP network and exchanging information. The MIP driver 15 is allocated with an IP address such as CCoA through a DHCP procedure using a FA function of the ASN-GW. The mobile user equipment 10 continuously uses the HoA previously allocated from the PMIP network as a home address.

The MIP driver 15 requests binding update such as location registration to the HA 40 using the CCoA. When requesting the binding update, a network identifier is transmitted together to inform accessing the CMIP network. The HA 40 detects a network currently accessed by the mobile user equipment 10 is a CMIP network.

The HA 40 performs binding update, transmits the binding update result to the mobile user equipment 10, and creates a CMIP tunnel to the mobile user equipment 10.

The mobile user equipment 10 transmits and receives data to/from the correspondent node 50 through the CMIP tunnel. Here, the data transmission and reception between the mobile user equipment 10 and the correspondent node 50 is performed through the PMIP tunnel before the CMIP tunnel is created.

Figure 7:
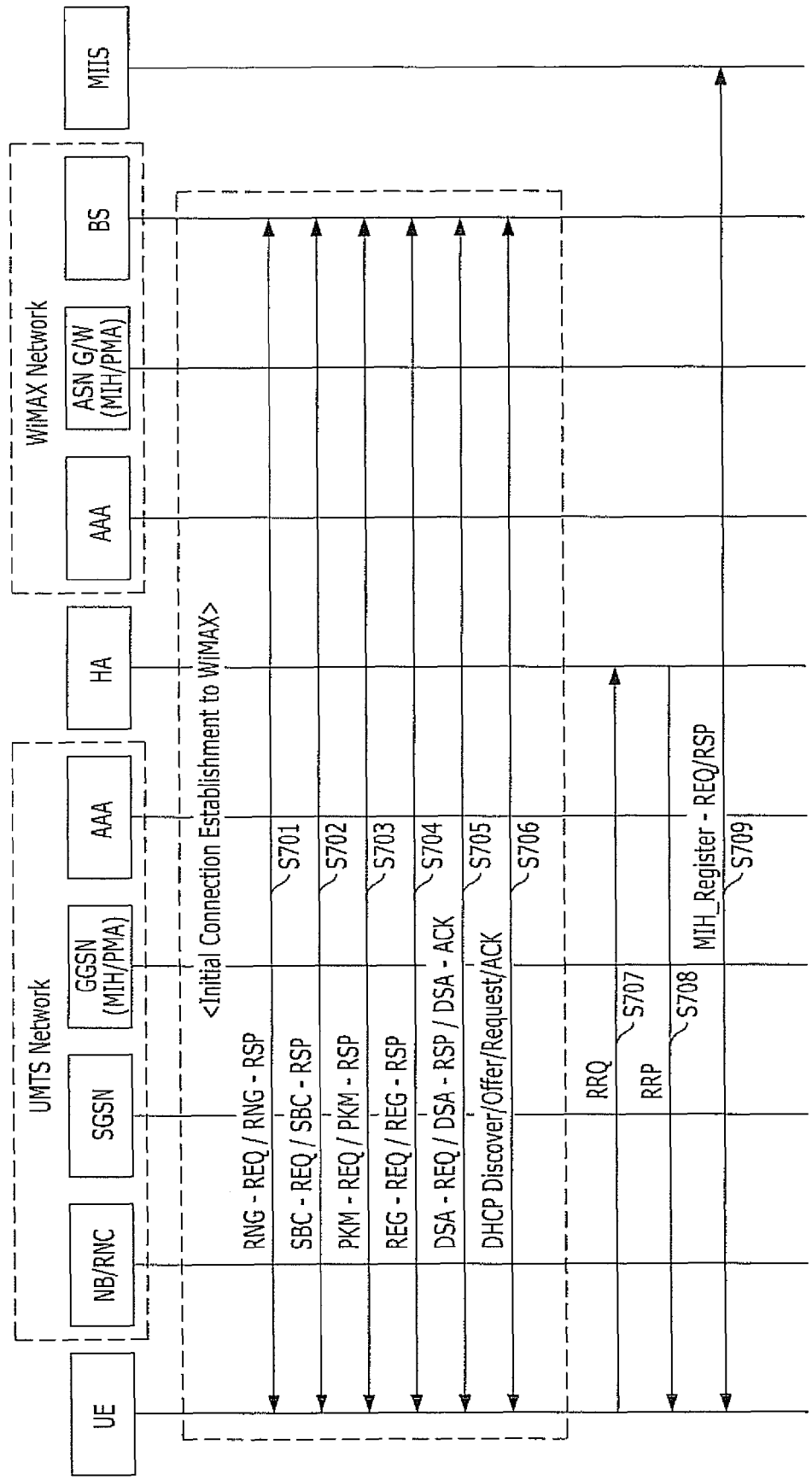
FIG. 7 is a diagram illustrating an initial access procedure for accessing a WiMAX network.

FIG. 7 is a flowchart illustrating an initial access procedure for accessing a WiMAX network.

The initial access procedure for accessing a WiMAX network at mobile user equipment is defined in IEEE 802.16e specification.

An additional signaling procedure for driving CMIP is a Registration ReQuest (RRQ) message and a Registration RePly (RRP) message exchanged between mobile user equipment and a Home Agent.

The ASN-GW secures an IP address to be used as a Care-of-Address (CoA) for the mobile user equipment and allocates the secured IP address to the mobile user equipment. Then, the mobile user equipment transmits the RRQ message to the HA. The HA receives the RRQ message, secures a Home IP Address (HoA), and informs the mobile user equipment of the corresponding HoA by transmitting a Registration RePly (RRP) message to the mobile user equipment.

After the HoA is allocated to the mobile user equipment, the mobile user equipment performs registration at a MIH Information Server (MIIS) and downloads from the MIIS heterogeneous handover related policy and network configuration information, which are required to decide handover.

Hereinafter, the initial access procedure for accessing a WiMAX network will be described in detail.

At steps S701 to S706, the mobile user equipment performs a wireless access and authentication procedure for accessing a WiMAX network.

At step S701, the mobile user equipment transfers a RNG request (RNG-REQ) message to a base station of WiMAX network and receives a RNG response (RNG-RSP) message as a response thereof from the base station of WiMAX network, thereby controlling timing of a wireless signal according to a distance between the base station and the mobile user equipment and selecting a useable frequency channel.

At step S702, the mobile user equipment negotiates with the base station to provide related functions using a procedure of transferring a SS Basic Capability request (SBC-REQ) message to the base station of WiMAX network and receiving a SBC response (SBC-RSP) message from the base station of WiMAX network.

At step S703, when authentication is requested using a Primary Key Management request (PKM-REQ) message between the mobile user equipment and the base station of WiMAX network, an authentication procedure is performed using an EPA request (EPA-REQ) message and an EPA response (EPA-RSP) message between the base station of WiMAX network and the ASN-GW of WiMAX network, and an access request/accept message between the ASN-GW of WIMAX network and an AAA server. The authentication result is transferred through a PKM response (PKM-RSP) message between the mobile user equipment and the base station of WiMAX network.

At step S704, when requesting negotiation for Internet service using a registration request (REG-REQ) message between the mobile user equipment and the base station of WiMAX network, the negotiation procedure for Internet service is performed using a REG-REQ message and a REG-RSP message between the base station of WiMAX network and the ASN-GW of WIMAX network. Then, the negotiation result is transferred through a REG-RSP message between the mobile user equipment and the base station of WiMAX network.

At step S705, the mobile user equipment performs a service flow generation procedure for Internet service using a Dynamic Service Addition REQuest (DSA-REQ) message, a DSA RESponse (DSA-RSP) message, and a DSA Acknowledgment (DSA-ACK) message between the base station of WIMAX network and the mobile user equipment.

At step S706, the mobile user equipment performs a CCoA allocation procedure for allocation an IP address through a Dynamic Host Configuration Protocol (DHCP). That is, the mobile user equipment requests IP allocation by transferring a DHCP Discover message to the ASN-GW of WIMAX network through the base station of WiMAX network. The ASN-GW of WIMAX network receiving the DHCP Discover message is provided with the IP address allocated to the mobile user equipment from the Home Agent. Then, the ASN-GW of WIMAX network transfers the provided IP address from the home agent to the mobile user equipment through a DHCP Offer message, thereby informing that the corresponding IP address is a usable IP address. After that, the mobile user equipment transfers a DHCP Request message to the ASN-GW of WIMAX network, thereby notifying an intention of using the corresponding IP address. Then, the ASN-GW of WIMAX network finally allows the mobile user equipment to use the corresponding IP address by transferring a DHCP ACK message to the mobile user equipment.

After completely accessing the WIMAX network as described above, the mobile user equipment transfers a Registration REQuest (RRQ) message at step S707 and receives a Registration RePly (RRP) message from the HA at step S708 to perform a CMIP registration procedure. Particularly, a CMIP client included in the mobile user equipment performs the CMIP registration procedure with the home agent.

When the mobile user equipment transmits a MIH registration REQuest (MIH_Register-REQ) message to the MIIS, the MIIS performs the registration procedure for the corresponding mobile user equipment and transmits a MIH registration response (MIH_Register-RSP) message to the mobile user equipment at step S709. The mobile user equipment downloads information on heterogeneous handover related policy and network configuration from the MIIS.

Figure 8:
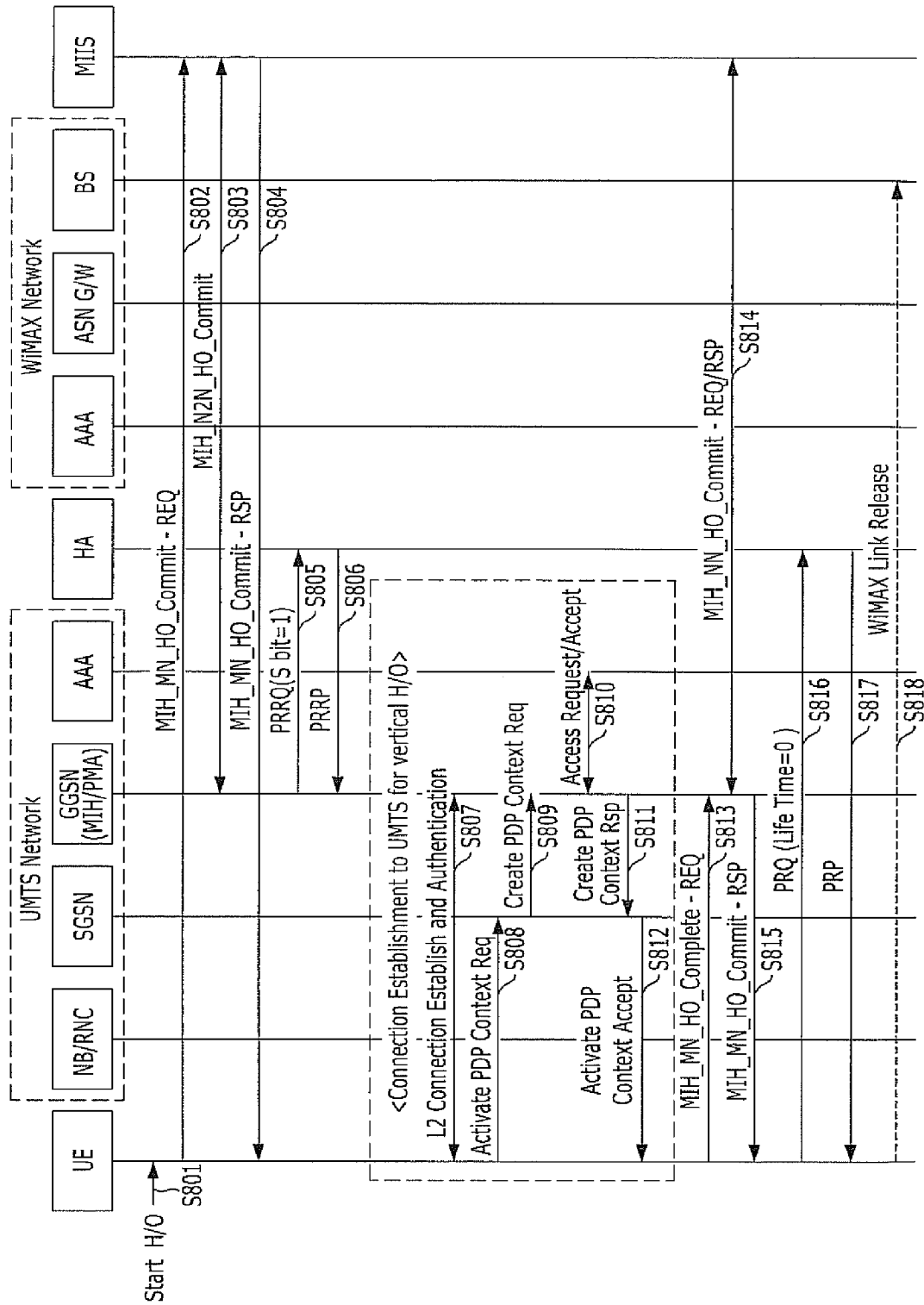
FIG. 8 is a flowchart illustrating a method for processing handover in a heterogeneous mobility protocol mixed networks in accordance with a second embodiment of the present invention.

FIG. 8 is a flowchart illustrating a method for processing handover in a heterogeneous protocol mixed network in accordance with an embodiment of the present invention. For example, the flowchart of FIG. 8 is a handover signaling procedure from a WiMAX network to a UMTS network.

After the mobile user equipment accesses the WiMAX network, the mobile user equipment transmits and receives user traffic through the WiMAX network.

If the intensity of a signal received from a base station of the WiMAX network becomes weak, handover may be performed from the WiMAX network to the UMTS network.

After deciding to perform the handover process, the mobile user equipment transmits a Handover Commit message to the MIIS. The MIIS transmits the Handover Commit message to a target GGSN of the UMTS network. The GGSN receives the Handover Commit message and performs a PMIP registration procedure. If a S bit of a PRRQ message header is setup as "1", the HA allows simultaneous biding.

When the mobile user equipment receives a Handover Commit response message, the mobile user equipment starts accessing the UMTS network. Before the mobile user equipment completely accesses the UMTS network, the mobile user equipment uses the WiMAX network to transmit and receive user traffic.

After the mobile user equipment completely accesses the UMTS network, the mobile user equipment exchanges a Handover Complete message with the GGSN and transmits a RRQ message to the HA by setting up a lift time of the RRQ message as "0". The HA receives the RRQ message and severs a CMIP tunnel between the mobile user equipment and the HA.

Hereinafter, a handover processing method in a heterogeneous protocol mixed network in accordance with a second embodiment of the present invention will be described.

At steps S801 to S804, the mobile user equipment performs a procedure for informing the MIIS that the mobile user equipment will perform a handover process. The HITS informs the GGSN that the mobile user equipment will perform a handover process, thereby invoking the GGSN to perform a PMIP registration procedure at steps S805 and S806.

At step S801, a handover process from a WiMAX network to a UMTS network begins. At step S802, the mobile user equipment transmits a MIH_MN_HO commit request (MIH_MN_HO_Commit-REQ) message to the MIIS. At step S802, the MIIS transmits a MIH_N2N_HO commit request (MIH_N2N_HO_Commit-REQ) message to the GGSN and receives a MIH_N2N_HO commit response (MIH_N2N_HO_Commit-RSP) message as a response thereof. At step S804, the MIIS transmits a MIH_MN_HO commit response (MIH_MN_HO_Commit-RSP) message to the mobile user equipment.

The GGSN transmits a Registration ReQuest (RRQ) message to the HA at step S805 and receives a Registration RePly (RRP) message as a response thereof from the HA at step S806, thereby performing a PMIP registration procedure. Here, if a S bit of a RRQ message header is setup as "1", the HA allows simultaneous binding to the WiMAX network and the UMTS network. After establishing simultaneous binding, the HA can transmit user traffic to the WiMAX network and the UMTS network at the same time. That is, a PMIP tunnel is established to the GGSN while maintaining an existing CMIP tunnel according to the simultaneous binding. Accordingly, user traffic can be transmitted to the WiMAX network and the UMTS network at the same time.

At step S807, the mobile user equipment performs a wireless access and authentication procedure for accessing a UMTS network. That is, the mobile user equipment uses a L2 Connection Establish and Authentication message to perform a wireless access and authentication procedure with the GGSN at the step S807.

At steps S808 to S810, the mobile user equipment performs a path establishing request procedure for UMTS network data service. That is, the mobile user equipment requests the SGSN to activate 'Packet data Protocol Context' using an 'Activate PDP Context Request' message at step S808. At step S809, the SGSN requests the GGSN to create 'Packet Data Protocol Context' using a 'Create PDP Context Request' message. At step S810, the GGSN requests the AAA server to authenticate corresponding accessing and receives the authentication result from the AAA server.

At step S811, the GGSN transfers an IP address to be allocated to the mobile user equipment to the SGSN using a Create PDP Context Req message. At step S812, the SGSN allocates the IP address to the mobile user equipment using an Activate PDP Context Accept message.

At steps S813 to S815, the mobile user equipment performs a procedure for informing the MIIS of handover completion as follows.

At step S813, the mobile user equipment transmits a MIH_MN_HO complete request (MIH_MN_HO_Complete-REQ) message to the GGSN. At step S814, the GGSN transmits the MIH_N2N_HO complete request (MIH_N2N_HO_Complete-REQ) message to the MIIS and receives a MIH_N2N_HO complete response (MIH_N2N_HO_Complete-RSP) message as a response thereof. At step S815, the GGSN transmits a MIH_MN_HO complete response (MIH_MN_HO_Complete-RSP) message to the mobile user equipment.

At step S816, the mobile user equipment requests the home agent to sever registration by setting up a lift time of the Registration ReQuest (RRQ) message as '0'. At step S817, the Home Agent transmits a Registration RePly (RRP) message to the mobile user equipment, thereby canceling a CMIP tunnel between the Home Agent and the mobile user equipment. Then, the mobile user equipment requests the base station of WiMAX network to cancel a WiMAX link at step S818.

After disconnecting the CMIP tunnel between the Home Agent and the mobile user equipment, only the PMIP tunnel between the Home Agent and the GGSN is continuously maintained. Accordingly, user traffic is transmitted or received through the corresponding PMIP tunnel.

Figure 9:
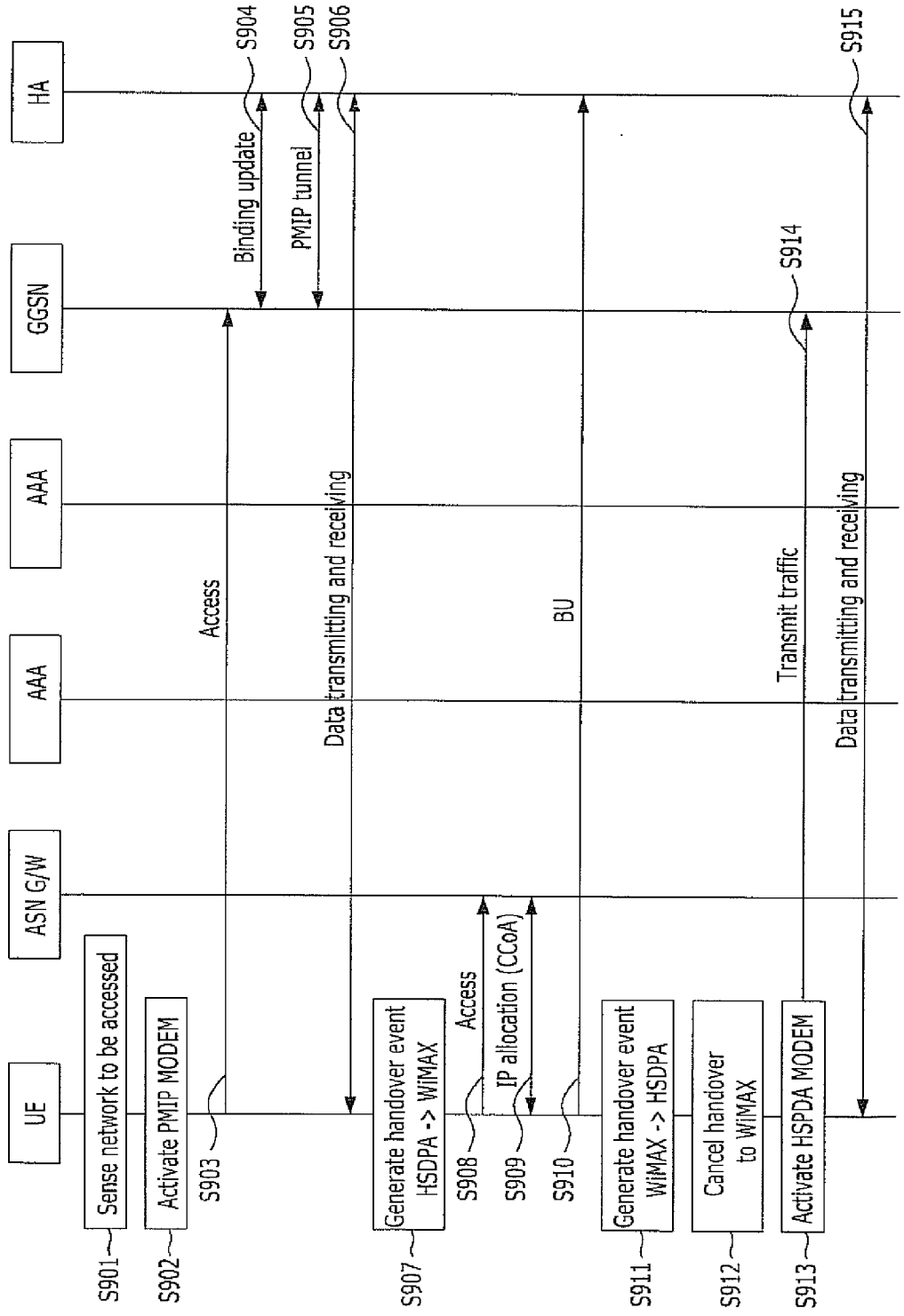
FIG. 9 is a flowchart illustrating a method for processing handover in a heterogeneous mobility protocol mixed networks in accordance with a third embodiment of the present invention.

FIG. 9 is a flowchart illustrating a method for processing handover in a heterogeneous protocol mixed network in accordance with a third embodiment of the present invention.

The handover processing method according to the third embodiment of the present invention is performed when mobile user equipment 10 enters a PMIP network again before the mobile user equipment 10 completely performs a handover process from a PMIP network to a CMIP network. Such a case may happen when the mobile user equipment 10 moves at a fast speed through a locally formed CMIP network or when a user instructs accessing the PMIP network.

At step S901, a MIP sensor 11 of the mobile user equipment 10 senses a network to access when power is turned on, when a user request an Internet service, or when a user instructs accessing a predetermined network. It is assumed that the MIP sensor 11 senses the PMIP network to access during such a network sensing procedure.

The access controller 12 activates the UMTS MODEM 13 at step S902. Accordingly, the UMTS MODEM 13 performs a resource negotiation procedure between a base station and a GGSN 30 for accessing the PMIP network and an access trying procedure for exchanging information between the mobile user equipment 10 and the base station at step S903.

Then, the GGSN 30 performs authentication of the mobile user equipment 10 through a second AAA server located at the PMIP network. The second AAA server of the PMIP network shares the authentication of the mobile user equipment 10 with a first AAA server of the CMIP network for interworking with the CMIP network.

At step S904, the UMTS MODEM 13 establishes connection to the GGSN 30, and the GGSN 30 is provided with a HoA from the HA 40, provides the HoA to the mobile user equipment 10, and requests the HA 40 binding update for the mobile user equipment 10 using own address as a temporal address (CCoA). When requesting the binding update, a network identifier informing accessing the PMIP network is transmitted together. The HA 40 detects that a network currently accessed by the mobile use equipment is the PMIP network based on the network identifier.

At step S905, the HA 40 performs binding update, transmits the binding update result to the GGSN 30, and creates a PMIP tunnel between the HA 40 and the GGSN 30.

At step S906, the mobile user equipment 10 uses the PMIP tunnel to exchange data with a correspondent node 50.

At step S907, the MIP sensor 11 of the mobile user equipment 10 creates a handover event while the mobile user equipment 10 is transmitting and receiving data to/from the correspondent node 50 if a user instructs accessing the CMIP network or if the mobile user equipment gets out of the PMIP network and enters the CMIP network.

At step S908, the access controller 12 interrupts the operation of the UMTS MODEM 13 and activates the WiMAX MODEM 14 to access the WiMAX network. Accordingly, the WiMAX MODEM 14 accesses the ASN-GW 20 through resource negotiation and information exchange with the base station of the CMIP network. At step S909, the MIP driver 15 receives an IP address (CCoA) using a FA function of the ASN-GW or through a Dynamic Host Configuration Protocol (DHCA) procedure. The mobile user equipment 10 uses a HoA previously allocated from the PMIP network as a home address.

At step S910, the MIP driver 15 transmits a binding update (BU) message for requesting binding update to the HA 40 using CCoA.

If the MIP sensor 11 senses the handover process to the PMIP network before the mobile user equipment 10 receives a RRP message as a response message of a BU message after transmitting the BU message at step S911, the access controller 12 determine cancelation of the handover process to the CMIP network at step S912. At step S913, the access controller 12 interrupts the operation of the WiMAX MODEM 14 and activates the UMTS MODEM 13.

The mobile user equipment 10 uses the previous PMIP tunnel created before the CMIP tunnel is created according to the generation of the handover event from the PMIP network to the CHIP network. Since the handover cancelation procedure (S912) is performed prior to the generation of the CHIP tunnel, the PMIP tunnel can be maintained as it is. Therefore, the mobile user equipment 10 can continuously transmit and receive data to/from the correspondent node 50 through the PMIP network only by activating the UMTS MODEM 413.

Figure 10:
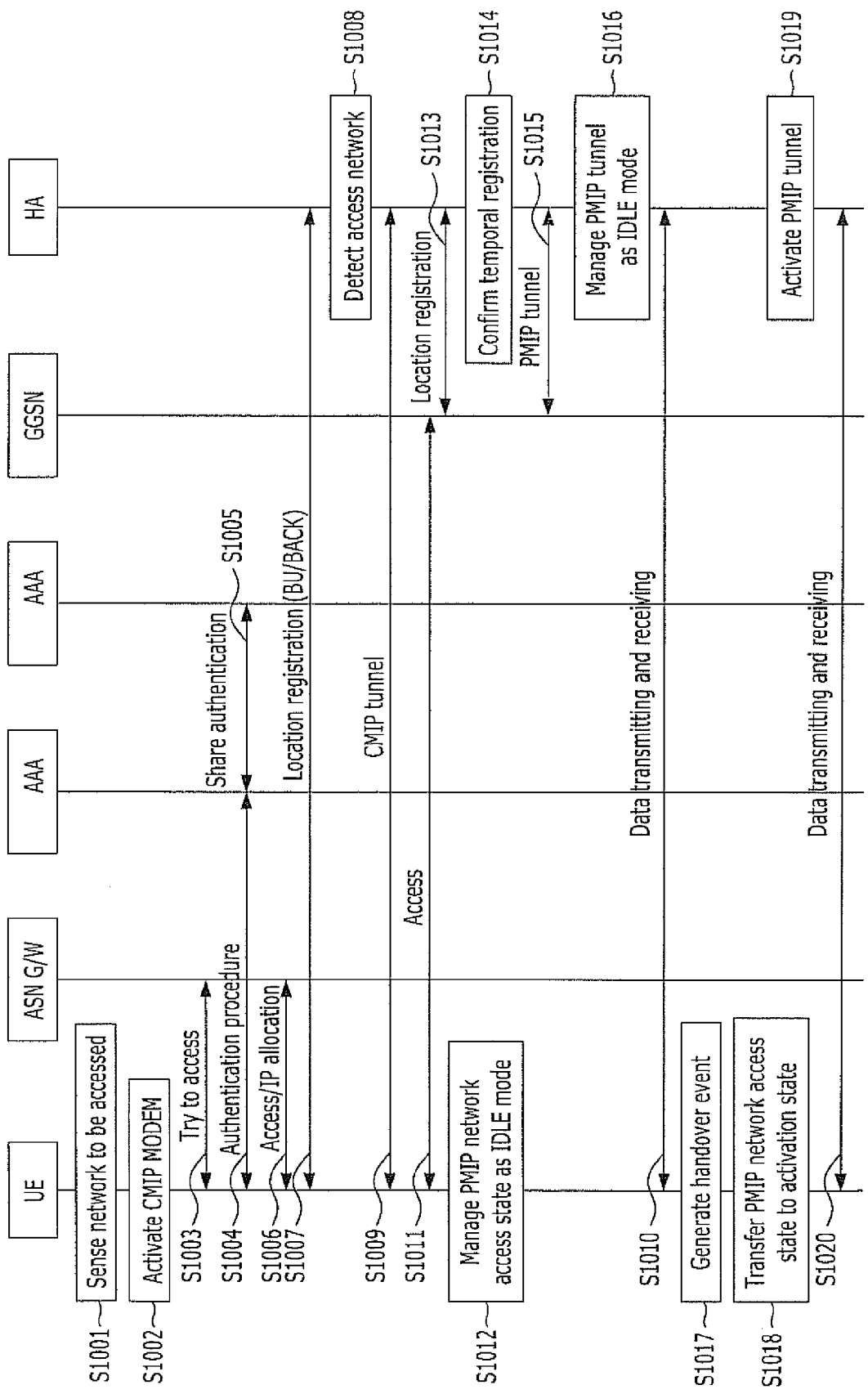
FIG. 10 is a flowchart illustrating a method for processing handover in a heterogeneous mobility protocol mixed networks in accordance with a fourth embodiment of the present invention.

FIG. 10 is a flowchart illustrating a method for processing handover in a heterogeneous protocol mixed network in accordance with a fourth embodiment of the present invention. Here, the heterogeneous protocol mixed network is a network including a CMIP network and a PMIP network.

At step S1001, a MIP sensor 11 of mobile user equipment 10 senses a network to access when power is turned or, when a user request an Internet service, or when a user instructs accessing a predetermined network. In the step S1001, it is assumed that the MIP sensor 11 senses the CMIP network to access.

The access controller 12 activates the WiMAX MODEM 14 at step S1002.

Accordingly, the WiMAX MODEM 14 performs an access try procedure for negotiating a base station for resources to access the CMIP network at step S1003.

At step S1004, the ASN-GW 20 authenticates the mobile user equipment 10 through a first AAA server located at the CMIP network. At step S1005, the first AAA server shares the authentication result with a second AAA server located at the PMIP network for interworking with the PMIP network.

After authentication, the WiMAX MODEM 14 establishes connection to the ASN-GW 20. When the ASN-GW 20 includes a FA function, the ASN-GW 20 creates a CCoA and allocates the CCoA to the mobile user equipment 10. When the ASN-GW does not include the FA function, the mobile user equipment 10 is allocated with a dynamic IP address through a DHCP procedure and uses the allocated IP address as a CCoA at step S1006. In this case, the mobile user equipment 10 uses a fixed IP as a HoA if the mobile user equipment 10 is allocated with a HoA from the HA 40 or is in an IPv6 environment.

At step S1007, the mobile user equipment 10 requests registration to the HA 40 by the MIP driver 15 using a BU message and is allocated a Home IP address. The BU message includes a network identifier informing accessing the CMIP network. The HA 40 uses the network identifier to detect that a network currently accessed by the mobile user equipment 10 is the CHIP network at step S1008.

At step S1009, a CMIP tunnel is created between the mobile user equipment 10 and the HA 40.

At step S1010, data is transmitted and received between the mobile user equipment 10 and the correspondent node 50 through the created CHIP tunnel.

As described above, the mobile user equipment 10 perform a procedure for accessing a PMIP network and creating a PMIP tunnel in order to prepare a handover to a PMIP network in advance while the mobile user equipment 10 is transmitting and receiving data by accessing the CHIP network at steps S1003 to S1010.

At step S1011, the access controller 12 of the mobile user equipment 10 activates the UMTS MODEM 13 and accesses the GGSN 30 of the PMIP network. Here, the mobile user equipment 10 informs the GGSN 30 of temporal access.

At step S1012, the access controller 12 of the mobile user equipment 10 changes the state of the UMTS MODEM 13 to an idle state so the UMTS MODEM 13 is in an un-used state although it is activated.

The GGSN 30 requests the HA 40 to perform binding update for the mobile user equipment 10 using own address as a CCoA according to the temporal access of the mobile user equipment 10 and transmits a temporal access identifier to inform the temporal access at step S1013. Alternately, the mobile user equipment 10 may provide a temporal access informing message to the HA 40 through the CMIP network in order to inform the HA 40 of the temporal access.

Meanwhile, since the mobile user equipment 10 already has a HoA, the GGSN 30 can omit performing a process of receiving the HoA from the HA 40.

At step S1014, the HA 40 determines based on the temporal access identifier that the mobile user equipment 10 tries to access the PMIP network in advance, not try to handover to the PMIP network.

Accordingly, the HA 40 performs binding update for the location of the mobile user equipment 10 with a CCoA transferred when requesting binding update and creates a PMIP tunnel to the GGSN 30 at step S1015. Then, the created PMIP tunnel is managed as an idle state at step S1016. Here, the idle state means a state that maintains the created PMIP tunnel without using.

Accordingly, the mobile user equipment 10 can immediately handover to the PMIP network by managing the PMIP tunnel in the idle state after the HA 40 generates the PMIP tunnel when the HA 40 generates the CHIP tunnel while the mobile user equipment 10 is transmitting and receiving data with a correspondent node 50 through the CHIP network.

Accordingly, when a handover event from the CHIP network to the PMIP network is generated at step S1017, the mobile user equipment 10 can omit a procedure of accessing the PMIP network by changing the UMTS MODEM 13 from the IDLE mode to the activation mode at step S1018.

When the MIP driver 15 of the mobile user equipment 10 transmits the IMP registration cancel message to the HA 40 to sever the existing CMIP tunnel, the HA 40 activates the PMIP tunnel, which is in an idle state, and severs the CHIP tunnel at step S1019.

Accordingly, the mobile user equipment 10 can transmit and receive data with the correspondent node 50 through the PMIP tunnel after the handover process is completed at step S1020.

In an embodiment of the present invention shown in FIG. 10, the mobile user equipment 10 accesses the PMIP network in advance to prepare the handover process while receiving a data service by accessing the CMIP network. However, the mobile user equipment 10 may access the CMIP network to prepare the handover process while receiving a data service by accessing the PMIP network.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

The present invention may be used in a wireless communication network including heterogeneous protocols such as a Client Mobile IP (CMIP) and a Proxy Mobile IP (PMIP).

The invention claimed is:

1. A method for performing a handover of user equipment between a UMTS network and a WiMAX network, comprising:
   accessing a base station of the UMTS network by a UMTS modem of the user equipment for handover of the user equipment;
   loading a proxy mobility agent ("PMA") into a gateway support node of the UMTS network so that the PMA interfaces with a home agent, the gateway support node and the user equipment;
   allocating a UMTS IP address to the user equipment by the home agent;
   transferring the UMTS IP address to the gateway support node so that a proxy mobile IP ("PMIP") tunnel between the home agent and the gateway support node can be created by the home agent;
   notifying the user equipment of the UMTS IP address by the PMA so that the user equipment can interface with the home agent via the PMIP tunnel between the home agent and the gateway support node;
   accessing a base station of the WiMAX network by a WiMAX modem of the user equipment for handover of the user equipment;
   allocating a WiMAX IP address to the user equipment by the home agent;
   notifying the user equipment of the WiMAX IP address by the home agent so that the user equipment can interface with the home agent via a client mobile IP ("CMIP") tunnel between the home agent and the user equipment, created by the home agent using the WiMax IP address; and
   cancelling the PMIP tunnel of the UMTS network by the home agent when the user equipment completes handover to the WiMAX network by using the CMIP tunnel for user traffic,
   wherein the home agent includes an access network detection function that determines whether the user equipment accesses a UMTS network or a WiMAX network, and
   wherein the access network detection function includes detecting the access network based upon a source address of the user equipment for a WiMAX network, and a source address of the gateway support node for a UMTS network.

2. The method of claim 1, wherein the home agent includes a dual IP tunnel creation function that simultaneously can create an IP tunnel from the home agent to the user equipment in a WiMAX network and an IP tunnel from the home agent to the gateway support node in a UMTS network.

3. The method of claim 1, wherein the user equipment further includes a MIP sensor that is suitable for sensing a UMTS network and a WiMAX network, an access controller that is suitable for controlling the UMTS modem and WiMAX modem based upon the sensing result of the MIP sensor, and a MIP operation unit that is suitable for interworking the user equipment with a WiMAX network.

4. The method of claim 3, further comprising:
   generating a handover event by the MIP sensor of the user equipment when the user equipment enters the WiMAX network from the UMTS network while the user equipment is transmitting and receiving data with a correspondent node;
   interrupting operation of the UMTS modem by the access controller of the user equipment; and
   activating operation of the WiMAX modem by the access controller of the user equipment.

5. The method of claim 1, further comprising:
   communicating with the user equipment via a correspondent node that transmits and receives user traffic through the home agent and the PMIP tunnel when the access network is a UMTS network and through the CMIP tunnel when the access network is a WiMAX network.

6. The method of claim 1, wherein the WiMAX network includes a foreign agent function for allocating a care of address ("CoA") to the user equipment.

7. A method for performing a handover of user equipment between a WiMAX network and a UMTS network, comprising:
   accessing a base station of the WiMAX network by a WiMAX modem of the user equipment for handover of the user equipment;
   allocating a WiMAX IP address to the user equipment by a home agent;
   notifying the user equipment of the WiMAX IP address by the home agent so that the user equipment can interface with the home agent via a CMIP tunnel between the home agent and the user equipment, created by the home agent using the WiMax IP address;
   accessing a base station of the UMTS network by a UMTS modem of the user equipment for handover of the user equipment;
   loading a proxy mobility agent ("PMA") into a gateway support node of the UMTS network so that the PMA interfaces with a home agent, the gateway support node and the user equipment;
   allocating a UMTS IP address to the user equipment by the home agent;

transferring the UMTS IP address to the gateway support node so that a proxy mobile IP ("PMIP") tunnel between the home agent and the gateway support node can be created by the home agent;

notifying the user equipment of the UMTS IP address by the PMA so that the user equipment can interface with the home agent via the PMIP tunnel between the home agent and the gateway support node; and cancelling the CMIP tunnel of the WiMAX network by the home agent when the user equipment completes handover to the UMTS network by using the PMIP tunnel for user traffic, wherein the home agent includes an access network detection function that determines whether the user equipment accesses a UMTS network or a WiMAX network, and wherein the access network detection function includes detecting the access network based upon a source address of the user equipment for a WiMAX network, and a source address of the gateway support node for a UMTS network.

8. The method of claim 7, wherein the home agent includes a dual IP tunnel creation function that simultaneously can create an IP tunnel from the home agent to the user equipment in a WiMAX network and an IP tunnel from the home agent to the gateway support node in a UMTS network.

9. The method of claim 7, wherein the user equipment further includes a MIP sensor that is suitable for sensing a WiMAX network and a UMTS network, an access controller that is suitable for controlling the WiMAX modem and UMTS modem based upon the sensing result of the MIP sensor, and a MIP operation unit that is suitable for interworking the user equipment with a WiMAX network.

10. The method of claim 9, further comprising:
generating a handover event by the MIP sensor of the user equipment when the user equipment enters the WiMAX network from the UMTS network while the user equipment is transmitting and receiving data with a correspondent node;
interrupting operation of the UMTS modem by the access controller of the user equipment; and
activating operation of the WiMAX modem by the access controller of the user equipment.

11. The method of claim 7, further comprising:
communicating with the user equipment via a correspondent node that transmits and receives user traffic through the home agent and the PMIP tunnel when the access network is a UMTS network and through the CMIP tunnel when the access network is a WiMAX network.

12. The method of claim 7, wherein accessing a base station by the UMTS modem includes the UMTS modem performing an access and authentication procedure with the gateway support node.

13. A method for performing a handover of an user equipment between a 3GPP access network and a non-3GPP access network by the user equipment, comprising:
sensing and determining access to the non-3GPP access network by the user equipment before starting the handover from the 3GPP access network to the non-3GPP access network;
accessing the 3GPP access network so that a network based mobility protocol tunnel between a first gateway of the 3GPP access network and a second gateway of the 3GPP access network is created;
starting the handover from the 3GPP access network to the non-3GPP access network;

transmitting a message to the second gateway to register an IP address of the non-3GPP access network obtained by the user equipment;
receiving a reply from the second gateway, wherein the reply is generated in response to the message; and
creating a client based mobility protocol tunnel with between the user equipment and the second gateway to allow user traffic to be transmitted through the second gateway with continuity of an application service;
performing a mobile IP (MIP) client function by the user equipment to provide IP mobility during the creation of the client based mobility protocol tunnel with the second gateway and
requesting cancelation of the network based mobility protocol tunnel by the user equipment once user traffic is transmitted through the client based mobility protocol tunnel,
wherein the second gateway is an anchor point for interworking between the 3GPP access network and the non-3GPP access network, and the first gateway is an access gateway of the user equipment,
wherein the network based mobility protocol tunnel is a Proxy Mobile Internet Protocol (PMIP) tunnel,
wherein the second gateway determines whether the user equipment accesses the 3GPP access network or the non-3GPP access network and detects the access network based upon a source address of the user equipment for the non-3GPP access network, and a source address of the first gateway for the 3GPP access network.

14. The method of claim 13, further comprising:
performing an authentication for accessing the non-3GPP access network before transmitting the message.

15. A method for performing a handover of an user equipment between a 3GPP access network and a non-3GPP access network by the user equipment, comprising:
sensing and determining access to the non-3GPP access network by the user equipment before starting the handover from the 3GPP access network to the non-3GPP access network;
accessing the 3GPP access network so that a network based mobility protocol tunnel between a first gateway of the 3GPP access network and a second gateway of the 3GPP access network is created;
starting the handover from the 3GPP access network to the non-3GPP access network;
transmitting a message to the second gateway to register an IP address of the non-3GPP access network obtained by the user equipment;
receiving a reply from the second gateway, wherein the reply is generated in response to the message; and
creating a client based mobility protocol tunnel with between the user equipment and the second gateway to allow user traffic to be transmitted through the second gateway with continuity of an application service;
performing a mobile IP (MIP) client function by the user equipment to provide IP mobility during the creation of the client based mobility protocol tunnel with the second gateway and
requesting cancelation of the network based mobility protocol tunnel by the user equipment once user traffic is transmitted through the client based mobility protocol tunnel,
wherein the second gateway is an anchor point for interworking between the 3GPP access network and the non-3GPP access network, and the first gateway is an access gateway of the user equipment, wherein the network based mobility protocol tunnel is a Proxy Mobile Internet Protocol (PMIP) tunnel and the client based mobility protocol tunnel is a Client Mobile Internet Protocol (CMIP) tunnel, wherein the second gateway determines whether the user equipment accesses the 3GPP access network or the non-3GPP access network and detects the access network based upon the CMIP message received from the user equipment for the non-3GPP access network, and the PMIP message received from the first gateway for the 3GPP access network.

16. The method of claim 15, further comprising:

performing an authentication for accessing the non-3GPP access network before transmitting the message.

* * * * *